United States Patent
Joo et al.

(10) Patent No.: US 10,486,043 B2
(45) Date of Patent: Nov. 26, 2019

(54) SENSING DEVICE AND SENSING METHOD USED IN BASEBALL PRACTICE APPARATUS, BASEBALL PRACTICE APPARATUS USING THE SENSING DEVICE AND THE SENSING METHOD, AND METHOD OF CONTROLLING THE BASEBALL PRACTICE APPARATUS

(71) Applicant: NEWDIN CONTENTS CO., LTD., Seoul (KR)

(72) Inventors: Sang Hyun Joo, Daejeon (KR); Se Hwan Kim, Daegu (KR); Bong Kyung Ko, Daejeon (KR)

(73) Assignee: NEWDIN CONTENTS CO., LTD., Seoul (KR)

( * ) Notice: Subject to any disclaimer, the term of this patent is extended or adjusted under 35 U.S.C. 154(b) by 17 days.

(21) Appl. No.: 16/068,369

(22) PCT Filed: Jan. 13, 2017

(86) PCT No.: PCT/KR2017/000462
§ 371 (c)(1),
(2) Date: Jul. 6, 2018

(87) PCT Pub. No.: WO2017/123041
PCT Pub. Date: Jul. 20, 2017

(65) Prior Publication Data
US 2019/0022487 A1    Jan. 24, 2019

(30) Foreign Application Priority Data
Jan. 14, 2016  (KR) ......................... 10-2016-0004526

(51) Int. Cl.
*A63B 69/00*    (2006.01)
*A63B 60/46*    (2015.01)
(Continued)

(52) U.S. Cl.
CPC .......... *A63B 60/46* (2015.10); *A63B 24/0021* (2013.01); *A63B 69/0002* (2013.01);
(Continued)

(58) Field of Classification Search
CPC ........ A63B 69/0002; A63B 2069/0008; A63B 24/0021; A63B 2024/0034;
(Continued)

(56) References Cited

U.S. PATENT DOCUMENTS 4,941,662 A * 7/1990 DePerna ................. A63C 19/00
273/317.6
5,443,260 A * 8/1995 Stewart .............. A63B 69/0002
473/421
(Continued)

FOREIGN PATENT DOCUMENTS

JP    2014-217468 A    11/2014
KR    20-0269859 Y1    3/2002
(Continued)

OTHER PUBLICATIONS

International Search Report for PCT/KR2017/000462 dated Apr. 28, 2017 from Korean Intellectual Property Office.

*Primary Examiner* — Lawrence S Galka
(74) *Attorney, Agent, or Firm* — Revolution IP, PLLC

(57) ABSTRACT

Disclosed are an image-sensing-based sensing device and sensing method that are capable of acquiring an image of the motion of a pitched ball or a hit ball and analyzing the acquired image in order to calculate an accurate and rapid motion model of the ball, which shows how the ball moves, in a baseball practice apparatus that allows a user to perform a baseball practice or to play a baseball game, whereby it is possible to very accurately and rapidly calculate various kinds of information necessary for conducting the baseball practice or the baseball game, such as motion parameters of the pitched ball or the hit ball, a baseball practice apparatus using the sensing device and the sensing method, and a method of controlling the baseball practice apparatus.

13 Claims, 8 Drawing Sheets

(51) Int. Cl.
*A63B 71/06* (2006.01)
*G06T 7/70* (2017.01)
*A63B 24/00* (2006.01)

(52) U.S. Cl.
CPC ............... *A63B 71/06* (2013.01); *G06T 7/70* (2017.01); *A63B 2069/0008* (2013.01); *A63B 2071/0694* (2013.01); *G06T 2207/30221* (2013.01)

(58) Field of Classification Search
CPC ............ A63B 2220/05; A63B 2220/12; A63B 2220/806; A63B 2220/807; A63B 2102/18; A63B 71/0605; A63B 60/46; A63F 13/213; A63F 13/573; A63F 13/812; G06T 2207/30221; G06T 7/70
See application file for complete search history.

(56) References Cited

U.S. PATENT DOCUMENTS

| | | | | |
|---|---|---|---|---|
| 5,768,151 A | * | 6/1998 | Lowy | A63B 24/0021 273/317.1 |
| 5,984,810 A | * | 11/1999 | Frye | A63B 24/0021 473/422 |
| 6,042,492 A | * | 3/2000 | Baum | A63B 24/0003 434/257 |
| 2001/0056000 A1 | * | 12/2001 | Hori | A63B 63/00 473/453 |
| 2006/0189418 A1 | * | 8/2006 | Kawai | A63B 24/0003 473/451 |
| 2010/0210377 A1 | * | 8/2010 | Lock | A63B 24/0003 473/409 |
| 2016/0279496 A1 | * | 9/2016 | Lee | G06Q 10/0639 |
| 2016/0279526 A1 | * | 9/2016 | Lee | A63F 13/812 |

FOREIGN PATENT DOCUMENTS

| | | |
|---|---|---|
| KR | 10-0411754 A | 12/2003 |
| KR | 10-0919371 B1 | 9/2009 |
| KR | 10-1055572 B1 | 8/2011 |
| KR | 10-2012-0016868 A | 2/2012 |
| KR | 10-2013-0001871 A | 1/2013 |
| KR | 10-2014-0100685 A | 8/2014 |
| KR | 10-1494204 B1 | 2/2015 |
| KR | 10-1505931 B1 | 3/2015 |
| KR | 10-1543371 B1 | 8/2015 |
| KR | 10-1546666 B1 | 8/2015 |
| KR | 10-1548511 B1 | 9/2015 |

* cited by examiner

SENSING DEVICE AND SENSING METHOD USED IN BASEBALL PRACTICE APPARATUS, BASEBALL PRACTICE APPARATUS USING THE SENSING DEVICE AND THE SENSING METHOD, AND METHOD OF CONTROLLING THE BASEBALL PRACTICE APPARATUS

TECHNICAL FIELD

The present invention relates to a baseball practice apparatus that allows a user to hit a ball pitched by a ball-pitching device with a bat or a baseball practice apparatus such as a screen baseball system that allows a user to hit, with a bat, a ball pitched by a ball-pitching device in an indoor space of a predetermined size, senses hitting through a sensing device, and realizes a simulation image according to the sensing result, a sensing device and a sensing method used in the baseball practice apparatus, and a method of controlling the baseball practice apparatus.

BACKGROUND ART

With the recent increase in the number of people enjoying baseball, a so-called screen baseball system has emerged, which overcomes the limitations of playing baseball in a wide baseball stadium and allows people to enjoy playing a virtual baseball game even in a small indoor space while experiencing virtual reality.

Typically, a screen baseball system is installed in an indoor space and has a batting area with a space of a predetermined size in which a user can bat and a screen capable of displaying a virtual baseball field. When a pitching machine installed on the back of the screen pitches a ball toward the batting area, a user who is ready to hit the ball in the batting area hits the ball pitched by the pitching machine. At this time, a sensing device senses the movement of the pitched ball and the movement of the ball hit by the user. Subsequently, based on the result of sensing, whether the pitched ball is a strike or a ball is determined, and an image simulating the trajectory of the hit ball is realized on the screen.

In connection with the sensing device, a conventional screen baseball system is configured to have a structure in which a plurality of optical sensor devices, each of which includes a plurality of light-emitting sensors and a plurality of light-receiving sensors, is installed in a path along which a pitched ball or a hit ball moves such that, when the ball passes by the optical sensor devices, the light-receiving sensors receives the light emitted by the light-emitting sensors and reflected by the ball, whereby each of the optical sensor devices acquires information about the coordinates of the ball in order to calculate the speed, direction, and the like of the pitched ball or the hit ball based thereon.

In the case in which a user hits a ball with a bat, whether the user swung or hit the ball is sensed using an additional sensor device.

The above-described technical content is disclosed in a plurality of related art documents, such as Korean Patent Application No. 10-2015-0041844, Korean Patent Application No. 10-2015-0041861, Korean Patent Application No. 10-2014-0054105, U.S. Pat. No. 5,443,260, and Japanese Registered Patent No. 4743763.

In the case in which a sensor device based on an optical sensor is used, as described above, it is necessary to provide a considerable number of light-emitting sensors and light-receiving sensors. As a result, costs related to the sensor device are considerably increased. In addition, there is a strong possibility of the sensor device being damaged or malfunctioning, whereby it is very difficult to maintain and repair the sensor device. Nevertheless, accurate analysis of a ball motion is limited, whereby accuracy in simulation of the ball motion is very low.

DISCLOSURE

Technical Problem

It is an object of the present invention to provide an image-sensing-based sensing device and sensing method that are capable of acquiring an image of the motion of a pitched ball or a hit ball and analyzing the acquired image in order to calculate an accurate and rapid motion model of the ball, which shows how the ball moves, in a baseball practice apparatus that allows a user to perform a baseball practice or to play a baseball game, whereby it is possible to very accurately and rapidly calculate various kinds of information necessary for conducting the baseball practice or the baseball game, such as motion parameters of the pitched ball or the hit ball, a baseball practice apparatus using the sensing device and the sensing method, and a method of controlling the baseball practice apparatus.

It is another object of the present invention to provide an image-sensing-based sensing device and sensing method that are capable of analyzing the motion of a pitched ball or a hit ball, determining whether a user swung, determining whether the user hit a ball, and determining whether the pitched ball is a ball or a strike using only a single sensing device without separate provision of various kinds of sensing devices, such as a sensing device for analyzing the motion of the pitched ball or the hit ball, a sensing device for determining whether the user swung, and a sensing device for determining whether the pitched ball is a ball or a strike, a baseball practice apparatus using the sensing device and the sensing method, and a method of controlling the baseball practice apparatus.

Technical Solution

In accordance with an aspect of the present invention, the above and other objects can be accomplished by the provision of a sensing device used in a baseball practice apparatus that allows a user to perform a baseball practice or to play a baseball game based on a virtual baseball image, the sensing device including a camera device for successively capturing images of a moving ball and a sensing-processor for collecting the images captured by the camera device, analyzing the collected images to extract the ball, calculating the coordinates of the ball in a three-dimensional space, determining a motion model of the ball using the calculated coordinate data, and calculating information necessary for conducting the baseball practice or the baseball game using the determined motion model of the ball.

In accordance with another aspect of the present invention, there is provided a sensing method of a sensing device used in a baseball practice apparatus that allows a user to perform a baseball practice or to play a baseball game based on a virtual baseball image, the sensing method including successively capturing and collecting images of a moving ball, analyzing the collected images to extract the ball and calculating coordinates of the ball in a three-dimensional space to extract coordinate data of the ball, determining a motion model of the ball using the extracted coordinate data, and calculating information necessary for conducting the baseball practice or the baseball game using the determined motion model of the ball.

In accordance with another aspect of the present invention, there is provided a baseball practice apparatus that allows a user to perform a baseball practice or to play a baseball game based on a virtual baseball image, the baseball practice apparatus including a ball-pitching device for pitching a ball toward a batting area, in which a user hits the ball, a sensing device for successively capturing and collecting images of a moving ball, analyzing the collected images to extract the ball, calculating the coordinates of the ball in a three-dimensional space, determining a motion model of the ball using the calculated coordinate data, and calculating information using the determined motion model of the ball, and a control device for receiving the information calculated by the sensing device and realizing an image for conducting the baseball practice or the baseball game based on the received information.

In accordance with a further aspect of the present invention, there is provided a method of controlling a baseball practice apparatus that allows a user to perform a baseball practice or to play a baseball game based on a virtual baseball image, the method including realizing an image of a virtual pitcher pitching a ball by a control device for realizing an image for conducting the baseball practice or the baseball game, performing control such that a ball-pitching device pitches a ball toward a batting area while being synchronized with the image of the virtual pitcher pitching the ball, a sensing device successively capturing, collecting, and analyzing images of the ball that is pitched by the ball-pitching device and then moves, extracting coordinate data of the moving ball in a three-dimensional space from the images, determining a motion model of the ball using the extracted coordinate data, and calculating information using the determined motion model of the ball, and the control device receiving the information calculated by the sensing device and realizing an image for conducting the baseball practice or the baseball game based on the received information.

Advantageous Effects

The sensing device and the sensing method used in the baseball practice apparatus, the baseball practice apparatus using the sensing device and the sensing method, and the method of controlling the baseball practice apparatus according to the present invention have the effect of acquiring an image of the motion of a pitched ball or a hit ball and analyzing the acquired image in order to calculate an accurate and rapid motion model of the ball, which shows how the ball moves, whereby it is possible to very accurately and rapidly calculate various kinds of information necessary for conducting a baseball practice or a baseball game, such as motion parameters of the pitched ball or the hit ball.

In addition, it is possible to analyze the motion of a pitched ball or a hit ball, to determine whether a user swung, to determine whether the user hit a ball, and to determine whether the pitched ball is a ball or a strike using only a single sensing device without the separate provision of various kinds of sensing devices, such as a sensing device for analyzing the motion of the pitched ball or the hit ball, a sensing device for determining whether the user swung, and a sensing device for determining whether the pitched ball is a ball or a strike.

BEST MODE

A sensing device and a sensing method used in a baseball practice apparatus, a baseball practice apparatus using the sensing device and the sensing method, and a method of controlling the baseball practice apparatus according to the present invention will be described in detail with reference to the accompanying drawings.

In the following description of the present invention, a "baseball practice apparatus" according to the present invention conceptually includes both a conventional baseball practice system, in which a pitching machine pitches a ball to allow batting practice and a user hits the pitched ball in a batting area, and a virtual baseball simulation system, which is installed in an indoor space, which has a batting area with a space of a predetermined size where a user can bat and a screen capable of displaying a virtual baseball field, and which is operated in such a manner that, when the pitching machine pitches a ball toward the batting area, a user who is ready to hit the ball in the batting area hits the ball pitched by the pitching machine, a sensing device senses the movement of the pitched ball and the movement of the ball hit by the user, and an image simulating the trajectory of the hit ball is realized on the screen based on the result of sensing. Hereinafter, the present invention will be described in detail.

Figure 1:
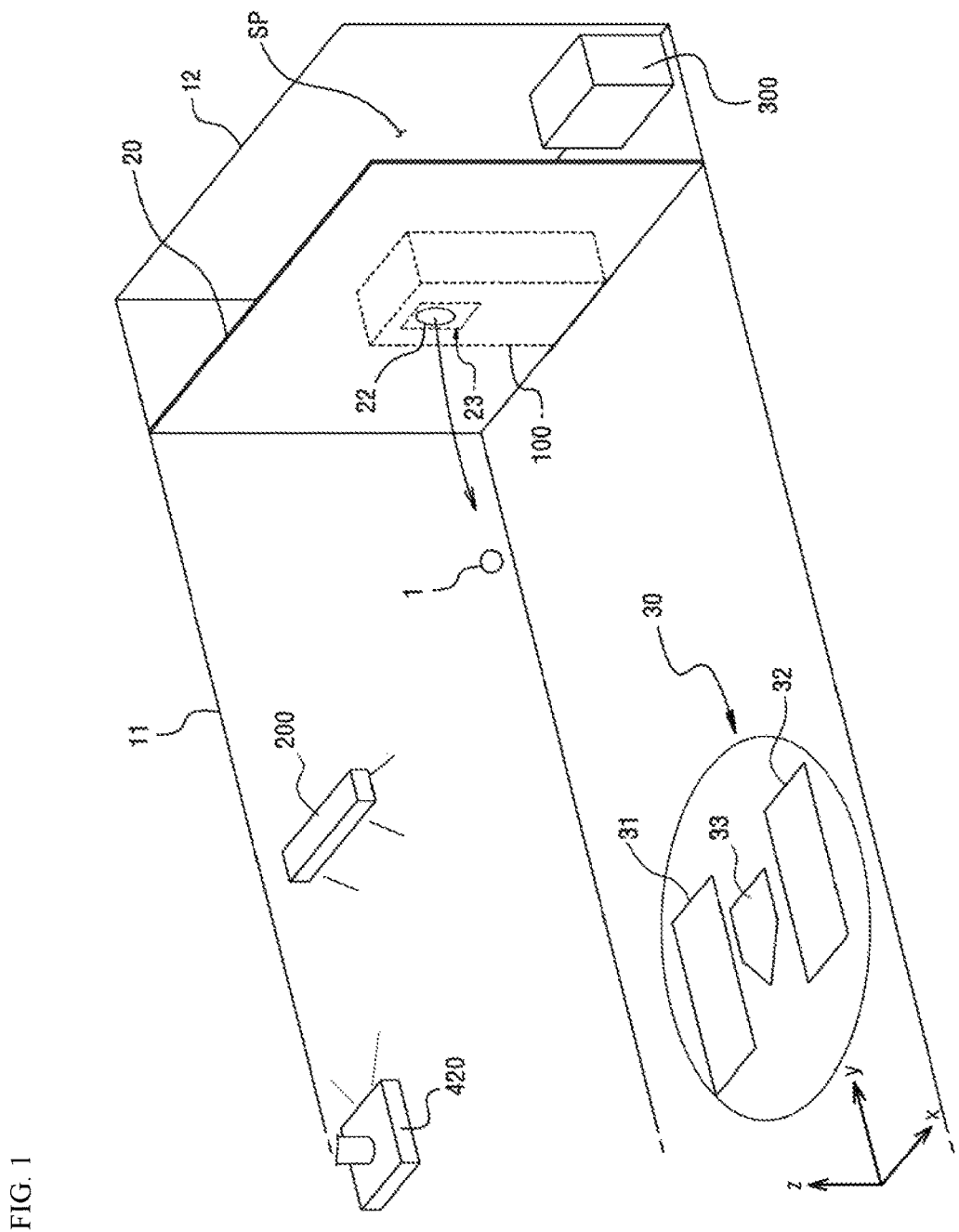
FIG. 1 is a view showing an example of a virtual baseball simulation system, i.e. a so-called screen baseball system, realized as a baseball practice apparatus according to an embodiment of the present invention.
Figure 2:
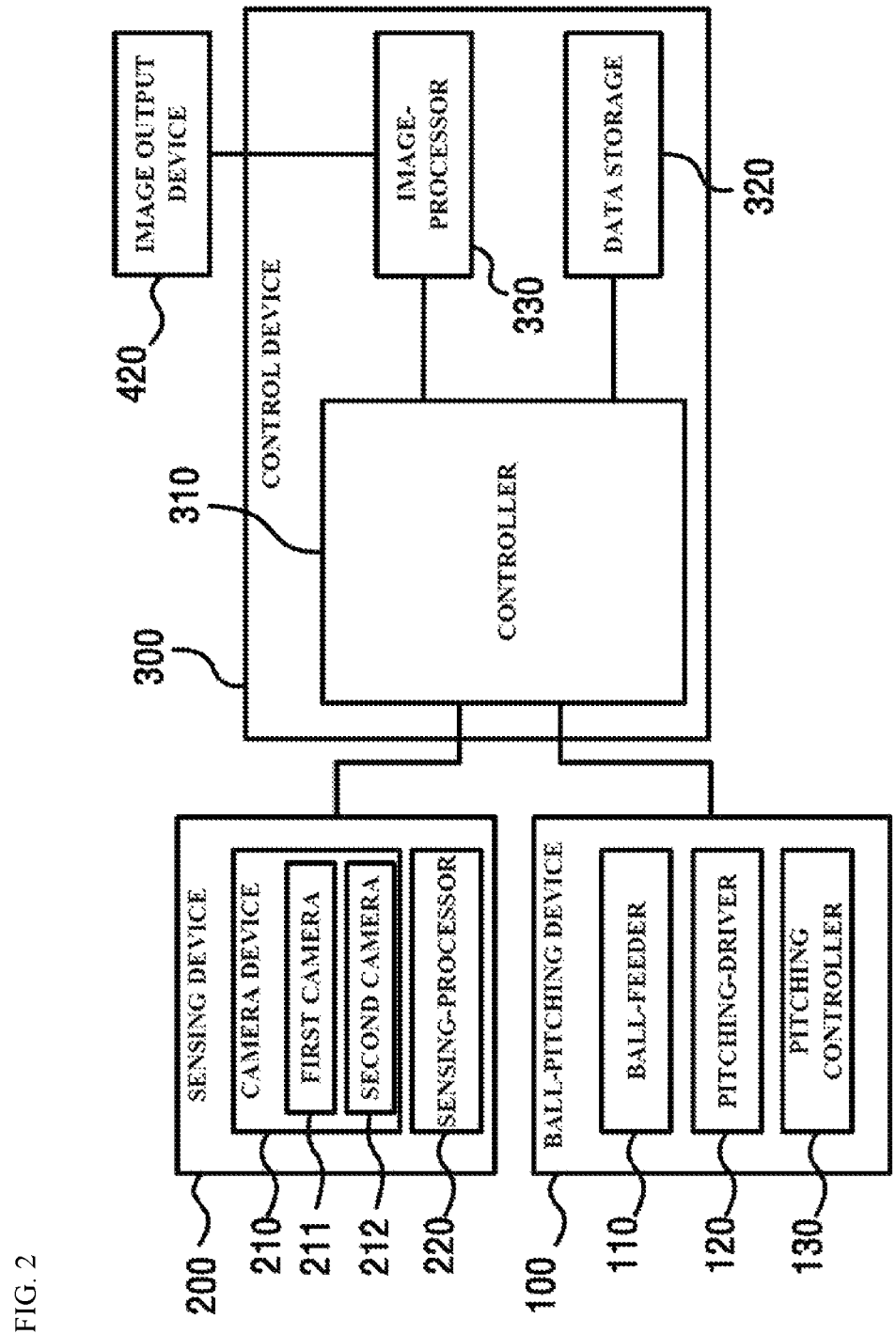
FIG. 2 is a block diagram showing the configuration of the baseball practice apparatus shown in FIG. 1.

First, a baseball practice apparatus according to an embodiment of the present invention will be described with reference to FIGS. 1 and 2. FIG. 1 is a view showing an example of a virtual baseball simulation system, i.e. a so-called screen baseball system, realized as a baseball practice apparatus according to an embodiment of the present invention, and FIG. 2 is a block diagram showing the configuration of the baseball practice apparatus shown in FIG. 1.

In the same manner as a typical screen baseball system, as shown in FIG. 1, a baseball practice apparatus according to an embodiment of the present invention includes a batting area 30 and a screen 20, which are arranged in a space defined by a side wall 11 and a rear wall 12, and is configured such that a user can swing and hit a ball with a bat in a batter's box 31 or 32 of the batting area 30. Here, reference numeral 31 denotes the right-handed batter's box, and reference numeral 32 denotes the left-handed batter's box. Hereinafter, the right-handed batter's box and the left-handed batter's box will be collectively referred to as a "batter's box", which is defined as including at least one of the right-handed batter's box or the left-handed batter's box.

In a space SP between the screen 20 and the rear wall 12 may be provided a control device 300 for processing information on a baseball simulation image to be projected onto the screen 20 (the image processed by the control device 300 is projected onto the screen 20 through an image output device 420), and may be installed a ball-pitching device 100 that is capable of pitching a ball 1 toward the batting area 30. A pitching hole 22 may be formed in the screen 20 at a position corresponding to the portion of the ball-pitching device 100 from which the ball is pitched such that the ball 1 can pass though the pitching hole 22.

As shown in FIG. 1, the ball-pitching device 100 may be provided in the front thereof with a hole opening and closing unit 23 for opening and closing the pitching hole 22 in the screen 20.

As shown in FIGS. 1 and 2, a control system of the baseball practice apparatus according to the embodiment of the present invention may include a control device 300, a ball-pitching device 100, and a sensing device 200.

As shown in FIG. 2, the ball-pitching device 100 may include a ball-feeder 110, a pitching-driver 120, and a pitching controller 130.

The ball-feeder 110 is a component that feeds balls one by one from a storage box in which a plurality of balls is stored to the pitching-driver 120, i.e. to a position for pitching.

The pitching-driver 120 is a component for pitching a ball fed by the ball-feeder 110. The pitching-driver 120 may be realized in various ways. For example, the pitching-driver 120 may be realized so as to rotate a wheel and pitch a ball placed between the wheel and a guide plate using the rotational force of the wheel (e.g. Japanese Patent Application Publication No. 2014-217468), may be realized so as to rotate two or more wheels, to locate a ball between the wheels, and to pitch the ball using the rotational force of the wheels (e.g. Korean Patent Application Publication No. 2014-0100685, Korean Registered Patent No. 0411754, and Korean Registered Utility Model No. 0269859), or may be realized so as to throw a ball by rotating an arm holding the ball (e.g. Korean Registered Patent No. 0919371).

Concrete configurations of the ball-feeder 110 and the pitching-driver 120 have already been disclosed in various related art documents, and therefore a detailed description thereof will be omitted.

The sensing device 200 analyzes a captured image to sense an object in the image. The sensing device 200 functions to acquire and analyze an image of a predetermined image-capture range including the batting area 30 in order to calculate ball motion information of a ball pitched by the ball-pitching device 100, to calculate information about whether a user hit the pitched ball, to calculate ball motion information of the ball hit by the user, to calculate information about whether the user swung and missed, or to calculate ball count information of the pitched ball when the user did not swing.

As shown in FIG. 2, the sensing device 200 may include a camera device 210 and a sensing-processor 220. The camera device 210 successively acquires images of a predetermined image-capture range including the batting area 30. The sensing-processor 220 receives the images from the camera device 210 and performs image analysis according to preset conditions in order to calculate information necessary for a baseball practice or a baseball game using the baseball practice apparatus.

The camera device 210 of the sensing device 200 may include a first camera 211 and a second camera 212, which capture images of the same image-capture range at different positions, i.e. stereoscopic images, in order to calculate three-dimensional position information of an object in the captured images such that the sensing-processor 220 analyses the images captured by the camera device 210 in order to acquire three-dimensional coordinate data of the ball.

The sensing-processor 220 receives and collects the captured images from the first camera 211 and the second camera 212 of the camera device 210, analyzes the collected images to extract three-dimensional coordinate data of the ball in the images, determines a motion model of the pitched ball or the hit ball using the extracted three-dimensional coordinate data, and calculates, using the determined ball motion model, various kinds of information necessary for a baseball practice or a baseball game using the baseball practice apparatus.

Here, the ball motion model may be expressed by a motion equation of the trajectory of a pitched ball or a hit ball in a three-dimensional space. As shown in FIG. 1, a space in which a baseball practice or a baseball game using the baseball practice apparatus is performed may be defined based on a three-dimensional coordinate system including an x-axis, a y-axis, and a z-axis such that the ball motion model can be determined based on the defined coordinate system.

That is, the ball motion model may be defined by a motion equation in the x-axis direction, a motion equation in the y-axis direction, and a motion equation in the z-axis direction, which will be described hereinafter in more detail.

The sensing device 200 may calculate the ball motion information and transmit the calculated ball motion information to the control device 300. The control device 300 may realize an image simulating the ball motion based on the received ball motion information and project the realized simulation image onto the screen 20 through the image output device 420.

Meanwhile, as shown in FIG. 2, the control device 300 may include a data storage 320, an image-processor 330, and a controller 310.

The data storage 320 is a unit that stores data for processing a baseball simulation image in the baseball practice apparatus. The data storage 320 may be configured to serve as a storage space for temporarily storing data received from a server (not shown).

The image-processor 330 processes the image data according to a preset program in order to generate various kinds of baseball-simulation-related images including a background image such as an image of a virtual baseball field and images of players, umpires, spectators, and the like, an image of a virtual pitcher pitching a ball, and an image simulating the trajectory of a ball hit by the user. The processed image is transmitted to the image output device 420. The image output device 420 outputs the received image by, for example, projecting the received image onto the screen 20 such that the user can see the image.

The controller 310 controls each component of the baseball practice apparatus according to the present invention and performs various operations for realizing a baseball simulation image, such as an image simulating the trajectory of the hit ball, based on various kinds of information received from the sensing device 200.

The controller 310 functions to determine the time at which the pitching hole 22 is opened or closed by the hole opening and closing unit 23, the time at which the ball-pitching device 100 is ready to pitch a ball, and the time at which a prepared ball is pitched (fired), and functions to send a control signal for instructing the pitching controller 130 to perform a corresponding operation.

The hole opening and closing unit 23 is basically controlled so as to keep the pitching hole 22 in the screen 20 closed. When the hole opening and closing unit 23 keeps the pitching hole closed, therefore, an image projected on the screen may be naturally seen without a portion thereof being omitted at the position of the pitching hole.

The controller 310 may control the operation of the ball-pitching device 100 such that the ball-pitching device 100 pitches a ball toward the batting area while being synchronized with the pitching motion of a virtual pitcher in an image of a baseball practice or a baseball game.

For example, the ball-pitching device 100 may sense the pitching motion of the virtual pitcher in the image and the movement state of the pitched ball and pitch a ball prepared so as to correspond to the motion of the virtual pitcher or the state of the pitched ball toward the batting area in order to make the user, who is ready to hit the ball in the batting area, feel as if the ball pitched by the virtual pitcher in the image were actually being thrown toward the user.

Hereinafter, a sensing method of the sensing device used in the baseball practice apparatus according to the embodiment of the present invention and a method of controlling the baseball practice apparatus will be described with reference to the flowcharts shown in FIGS. 3 and 4.

Figure 3:
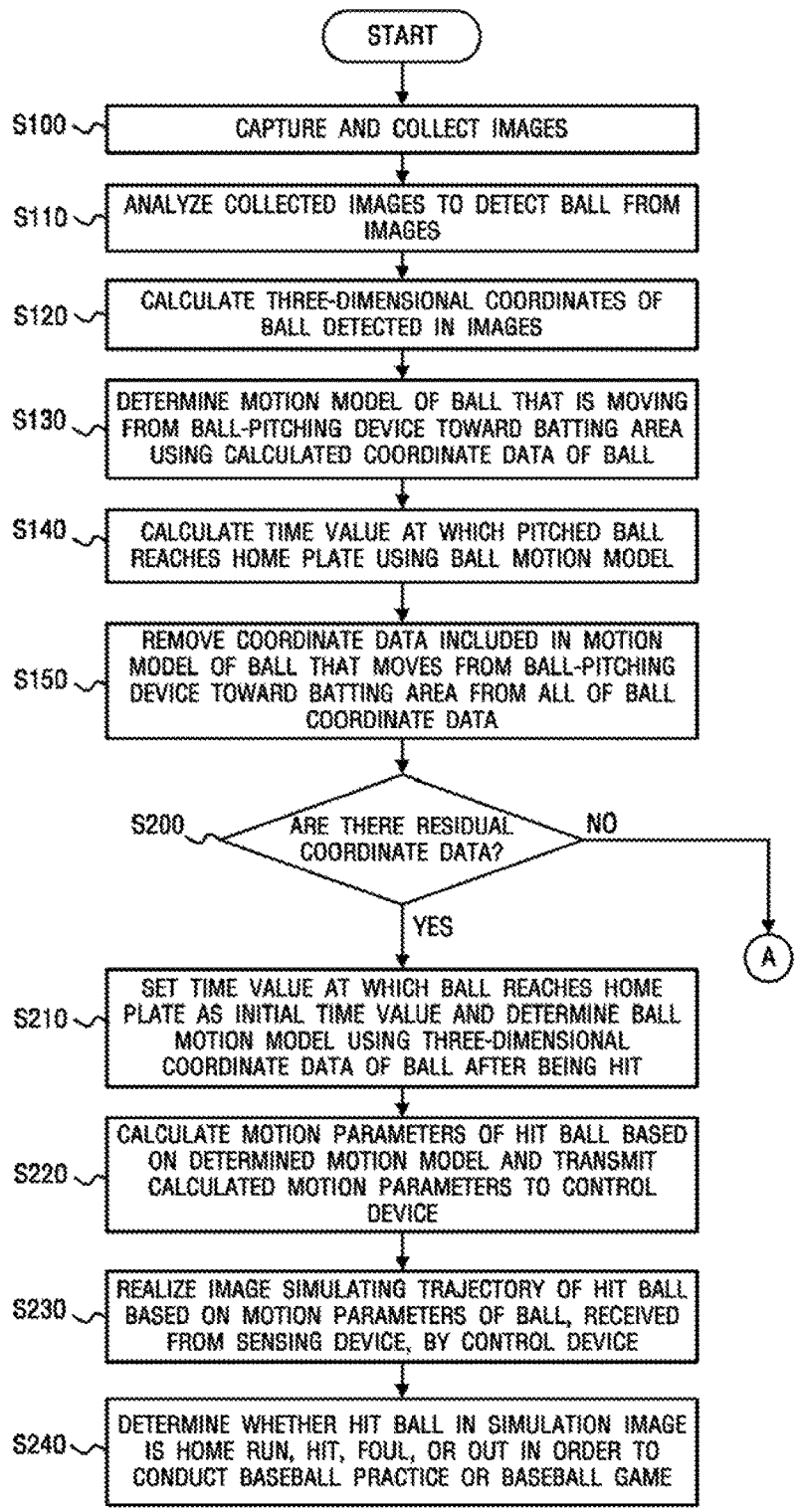
FIGS. 3 and 4 are flowcharts showing a sensing method of a sensing device and a control method of a control device in the baseball practice apparatus having the configuration shown in FIG. 2.
Figure 4:
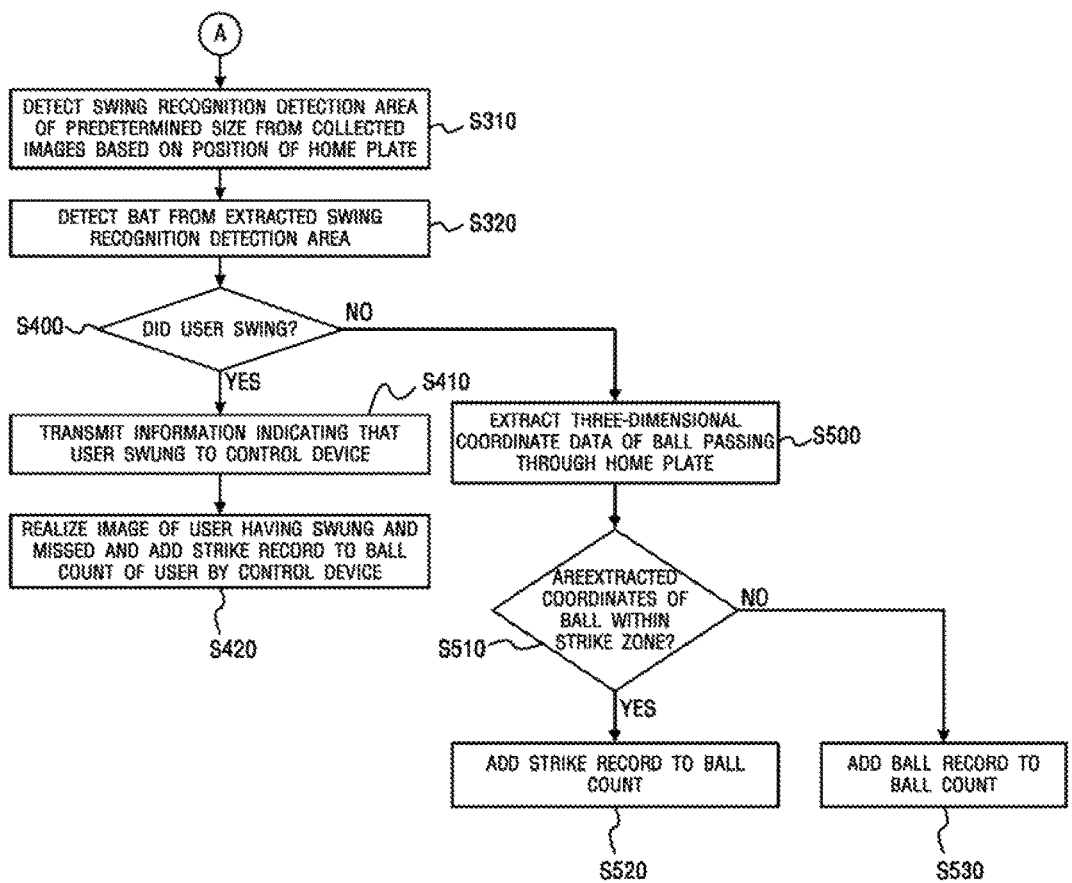

FIGS. 3 and 4 are flowcharts showing a sensing method of the sensing device and a control method of the control device in the baseball practice apparatus having the configuration shown in FIG. 2. The step denoted by A in the flowchart shown in FIG. 3 is connected to part A shown in FIG. 4.

As shown in FIG. 3, when the baseball practice apparatus according to the embodiment of the present invention is operated, the camera device of the sensing device successively acquires images of an image-capture range, and the acquired images are collected by the sensing-processor (S100).

When a predetermined number of images are collected, the sensing-processor analyzes the collected images in order to detect a ball from the respective images (S110). Here, the detected ball may be a ball that is actually moving or a ball that is located on the ground in a playing space. Furthermore, the detected ball may include other kinds of noise.

Speaking more precisely, therefore, the ball detected at step S110 is a ball candidate.

The ball candidate in the respective images may be detected through several ball detection processes.

First, the sensing-processor stores an image that is captured in advance before the movement of the ball as a reference image. Of course, when a trigger is generated by a trigger process after the ball is actually pitched or hit, an image at that time may be stored as the reference image.

Here, the trigger is generated when a specific area is preset in an image and a ball is detected in the preset area. The sensing-processor analyzes a predetermined number of images before and after the time at which the trigger is generated in order to detect the ball.

When a difference image between images captured after the ball is pitched and the reference image is acquired using image differencing, a moving object including the moving ball is apparent in the difference image.

A threshold of a pixel value (a brightness value) of each pixel in the difference image is preset, and the difference image is binarized based on the preset threshold (pixels having pixel values that exceed the threshold are expressed as white and pixels having pixel values that do not exceed the threshold are expressed as black for binarization).

For an actual ball (an actual baseball), pixel values, i.e. brightness values, in an image thereof are high due to lighting. When binarization is performed, therefore, a moving ball appears white, and the remaining portion appears black. Consequently, it is possible to easily detect the moving ball in the image.

The sensing-processor extracts a contour of the portion that appears white from the binarized image, and performs analysis on the extracted contour under predetermined conditions, such as an aspect ratio of the contour, the size of the contour, the brightness in the contour (the sensing-processor presets a range of the aspect ratio of a ball, a range of the size of the ball, and a range of the brightness of the ball). For example, in the case in which the extracted contour is long and thus the aspect ratio deviates from the preset range or in the case in which the size of the extracted contour deviates from the preset range or is too small, corresponding portions of the contour are removed in order to select an effective portion of the extracted contour as a ball candidate (however, some of the selected ball candidates may include a ball located on the ground or other kinds of noise).

The sensing-processor calculates three-dimensional coordinates of the ball detected in the respective images as described above, i.e. the ball candidate (S120).

The three-dimensional coordinates may be calculated using coordinate information acquired from an image of the same object acquired by the first camera and an image of the same object acquired by the second camera. The acquisition of three-dimensional coordinates of an object using a stereoscopic camera system is well known in the art, and therefore a description thereof will be omitted.

The sensing-processor determines a motion model of the ball that is moving from the ball-pitching device toward the batting area (the ball is pitched by the ball-pitching device) using the coordinate data of the ball calculated as described above (S130).

The ball motion model may be determined by calculating a motion equation in each axial direction in the spatial coordinate system having the x-axis, the y-axis, and the z-axis, as illustrated in FIG. 1, using the three-dimensional coordinate data of the ball. In the baseball practice apparatus according to the embodiment of the present invention, the ball motion model may be established and determined in consideration of the case in which the pitched ball or hit ball collides with the wall or the ceiling in a limited space (for example, a space defined by the side wall 11 and the rear wall 12, as shown in FIG. 1).

A more concrete example of steps S110, S120, and S130, which are related to the determination of the ball motion model, will be described with reference to FIGS. 5 and 6.

Figure 5:
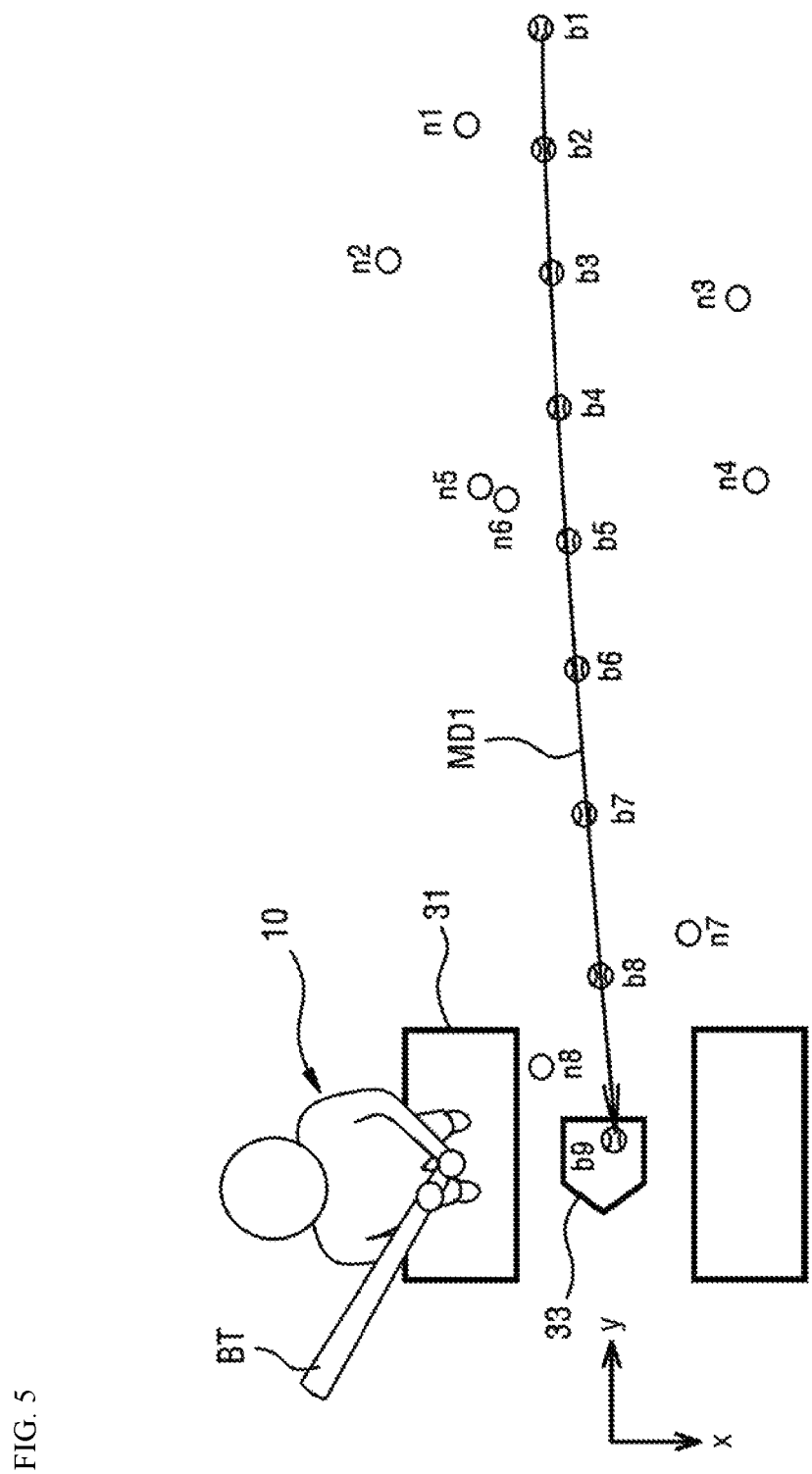
FIG. 5 is a view showing an image captured by a camera constituting a camera device of a sensing device according to an embodiment of the present invention, wherein ball images in a plurality of frames of the image are shown together in order to illustrate a process in which the sensing device detects a ball and determines a ball motion model.

FIG. 5 is a view showing an image captured by one of the cameras constituting the camera device of the sensing device, wherein ball images b1 to b9 in a plurality of frames of the image are shown together in order to illustrate a process in which the sensing device according to the embodiment of the present invention detects a ball from the images and determines a ball motion model.

Figure 6:
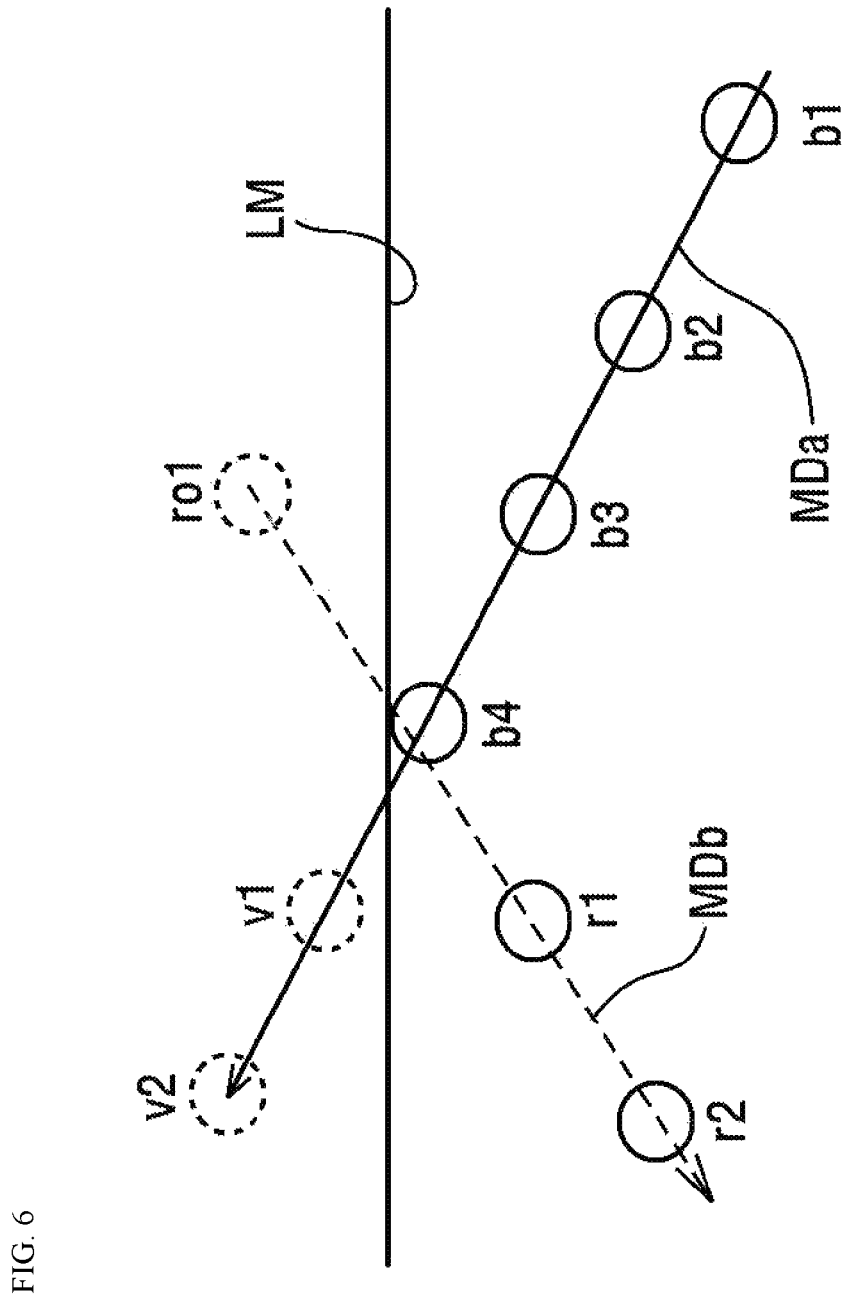
FIG. 6 is a view illustrating that the sensing device according to the embodiment of the present invention determines the ball motion model in consideration of the case in which a pitched ball or a hit ball collides with the wall or the ceiling.

FIG. 6 is a view illustrating that the sensing device determines the ball motion model in consideration of the case in which a pitched ball or a hit ball collides with the wall or the ceiling.

Here, a spatial coordinate system is identical to the coordinate system having the x-axis, the y-axis, and the z-axis shown in FIG. 1.

As shown in FIG. 5, an image captured and collected by the camera device of the sensing device includes a user 10, who is ready to hit a ball with a bat BT in the batter's box 31, and a home plate 33. In addition, balls b1 to b9 that are moving toward the batting area after the ball is pitched as well as balls located on the ground and other kinds of noise n1 to n8 appear.

Here, the sensing-processor of the sensing device may predefine and set a function of the ball motion in the x-axis direction, a function of the ball motion in the y-axis direction, and a function of the ball motion in the z-axis direction in order to establish the ball motion model, and may apply three-dimensional coordinate data of the balls b1 to b9, as shown in FIG. 5, to each function in order to determine a motion equation of the ball motion in each axial direction, whereby the ball motion model may be established.

However, as shown in FIG. 5, various kinds of noise n1 to n8 as well as the balls b1 to b9 may be included in the image, which is analyzed, and it is assumed that these are the ball candidates detected at step S110.

At step S120, three-dimensional coordinate data of the ball candidates b1 to b9 and n1 to n8 are calculated. At this time, it is possible to know the time value of the ball candidates, in addition to the three-dimensional coordinate data of the ball candidates (for example, when a ball candidate appears in an n-th frame of the image, the frame number or the time stamp value of the ball candidate may be stored as the time value).

Meanwhile, in order to the coordinate data of an effective one of the ball candidates, it is necessary to remove the coordinate data of the ball after collision with the wall or the ceiling in the case in which the ball collides with the wall or the ceiling.

FIG. 6 shows the case in which the ball moving in the sequence b1→b2→b3→b4 rebounds from an obstacle LM, such as a wall or a ceiling, in the sequence of r1→r2 after collision thereof with the obstacle LM.

Since a desired motion model is a motion model MDa of a ball that moves in the sequence of b1→b2→b3→b4→v1→v2, it is necessary to remove r1 and r2 from the example shown in FIG. 6.

In order to remove data after the collision of the ball, two or more ball candidates (a predetermined number of ball candidates) are selected from the ball candidates, the coordinate data of the selected ball candidates are applied to a function of the ball motion in each axial direction, whereby a motion equation in each axial direction is established, and therefore an arbitrary motion model is established.

In establishing the ball motion model, it is necessary to calculate an initial time value of the motion model. The initial time value is a time value of data included in the ball motion model when the ball starts to move. In the case in which a range of the angle of view of the camera device of the sensing device includes even the screen in FIG. 1, the initial time value may be a time value at which the ball is pitched, which is already known.

In the case in which the range of the angle of view of the camera device of the sensing device does not include the screen, it is not possible to set the time value at which the ball is pitched as the initial time value. In this case, a time value at which a moving object, i.e. a ball, appears for the first time in the image captured by the camera device of the sensing device may be set as the initial time value. Alternatively, a time value at which a ball candidate having the largest coordinate value in the y-axis direction in the x-y-z coordinate system shown in FIG. 1, among the detected ball candidates, appears in the image may be set as the initial time value.

In the case in which the initial time value of the ball motion is calculated as described above, the calculated initial time value may be substituted into the arbitrary motion model in order to confirm the coordinate value of the start point of the ball motion.

In addition, the coordinate value of the ball candidate having the largest coordinate value in the y-axis direction, among the detected ball candidates, as described above may be set as the coordinate value of the start point of the ball motion. In the case in which a plurality of ball candidates shares the largest coordinate value in the y-axis direction, the time value thereof may be applied to a motion model, a description of which will follow, as the initial time value in order to calculate the coordinate value of the start point of the ball motion.

In the case in which r1 and r2 are selected to establish an arbitrary motion model MDb in FIG. 6, as described above, therefore, the initial time value of the ball pitching may be substituted into the arbitrary motion model MDb in order to confirm the coordinate value of the start point of the ball motion. In FIG. 6, the coordinate value of the start point of the ball motion of the arbitrary motion model MDb is ro1.

Since ro1 is present outside the wall or ceiling LM, as shown in FIG. 6, however, the coordinates of the start point of the ball motion are present outside the playing space of the baseball practice apparatus. Consequently, the coordinate data included in the arbitrary motion model MDb are removed, since the coordinate data included in the arbitrary motion model MDb are not effective.

In this way, the initial coordinate value of the ball based on the initial time value of the motion model established by arbitrarily applying the coordinate data to a function of the ball motion in each axial direction may be confirmed, whereby it is possible to remove all data that are not effective (an arbitrarily predetermined number of data may be selected from all data or some data in order to establish a motion model, whereby it is possible to remove data that are not effective).

Here, the "coordinate data included in the motion model" are defined as including both coordinate data in the case in which the coordinate values thereof are present in the established motion model and coordinate data in the case in which the coordinate values thereof are not present in the established motion model but approximate, to a predetermined level, the established motion model. Here, "approximating to a predetermined level" means the case in which an error range is preset through a plurality of experiments and data are present within the preset error range.

In the following description, "the coordinate data included in the motion model" means coordinate data within the preset error range of the motion model, as described above.

Meanwhile, in the case in which a ball located on the ground is included in the noise n1 to n8 shown in FIG. 5, the coordinate data of the ball located on the ground may be selected in order to establish an arbitrary motion model and thus to confirm the initial coordinate value, as described above. Since the ball is also present outside the playing space of the baseball practice apparatus, therefore, it is possible to remove all coordinate data included in the motion model arbitrarily established by the coordinate data of the noise.

It is possible to remove data that are not effective through the process of establishing the arbitrary motion model and confirming the initial coordinate value, as described above, and it is possible to determine a final ball motion model from the remaining data.

Even after data that are not effective are removed through the process of establishing the arbitrary motion model and confirming the initial coordinate value, as described above, some noise may remain.

In this case, the ball motion model may be established based on data having influence (inliers), among the distributed data, like a random sample consensus (RANSAC) algorithm, in order to determine an accurate ball motion model, and the remaining data, which are not inliers (i.e. are outliers), may be removed to determine a final ball motion model.

That is, as shown in FIG. 5, a motion model MD1 having the sequence b1→b2→b3→b4→b5→b6→b7→b8→b9 may be determined as the motion model of the pitched ball. Of course, an accurate motion model like the motion model MD1 may not be actually calculated due to some noise. In the case in which the motion model is calculated using the above method, however, it is possible to determine a highly accurate motion model having a negligible error range.

In determining the ball motion model, each axis-direction function may be defined as follows based on some assumptions.

<A y-Axis Direction Function>

The motion of a moving ball in the y-axis direction over time may be assumed to be a uniform motion, and thus may be expressed as a primary function of time as follows.

$$y = a\_y * t + b\_y$$

where t indicates a time value, y indicates a coordinate value in the y-axis direction, a_y indicates an increment of the y-axis coordinate over time (a gradient of the function), and b_y indicates a coordinate value in the y-axis direction when t is 0 (an intercept).

<An x-Axis Direction Function>

The motion of a moving ball in the x-axis direction over time may also be assumed to be a uniform motion, and thus may be expressed as a primary function of time as follows.

$$x = a\_x * t + b\_x$$

where t indicates a time value, x indicates a coordinate value in the x-axis direction, a_x indicates an increment of the x-axis coordinate over time (a gradient of the function), and b_x indicates a coordinate value in the x-axis direction when t is 0 (an intercept).

<A z-Axis Direction Function>

The motion of a moving ball in the z-axis direction over time may be assumed to be a uniformly accelerated motion, in which gravity is constantly applied to the ball, and thus may be expressed as a secondary function of time as follows.

$$z = a\_z * t + b\_z - 0.5 * g * t^2$$

where g indicates acceleration due to gravity, t indicates a time value, z indicates a coordinate value in the z-axis direction, a_z indicates a speed in the z-axis direction when t is 0, and b_z indicates a coordinate value in the z-axis direction when t is 0 (an intercept).

Meanwhile, in the case in which the number of data included in the ball motion model finally determined as described above is very small (the number of data may be preset), the sensing device according to the embodiment of the present invention may determine that the motion model is based on ineffective data and may thus determine that the motion model is noise.

Upon determining that the finally determined ball motion model is noise, the baseball practice apparatus may inform the user that the pitching is an error and may allow play to be resumed.

Referring back to FIG. 3, steps S110, S120, and S130 may be performed as described with reference to FIGS. 5 and 6 in order to determine the motion model of the pitched ball.

The sensing-processor calculates a time value at which the pitched ball reaches the home plate using the ball motion model determined as described above (S140).

The ball motion model determined at step S130 may be determined before the pitched ball reaches the home plate. In this case, the time value at which the pitched ball reaches the home plate may be calculated based on the ball motion model determined as described above.

For example, the time value at which the pitched ball reaches the home plate may be calculated by the following equation.

$$t_h = (y_h - b\_y) / a\_y$$

where $t_h$ indicates a time value at which the pitched ball reaches the home plate, $y_h$ indicates a coordinate value of the home plate in the y-axis direction, a_y indicates an increment of the y-axis coordinate over time in the y-axis direction function (a gradient of the function), and b_y indicates a coordinate value in the y-axis direction when t is 0 in the y-axis direction function (an intercept).

The sensing-processor may preset a coordinate value of the home plate in the y-axis direction (since the home plate is stationary, it is possible to know position information of the home plate in advance), and may calculate a time value at which the ball reaches the coordinate value of the home plate in the y-axis direction using the ball motion model.

In the case in which the ball is subsequently hit, the time value at which the pitched ball reaches the home plate is used in order to determine the motion model of the hit ball.

Meanwhile, the sensing-processor removes coordinate data included in the ball motion model determined as described with reference to FIGS. 5 and 6 (the motion model of the ball that moves from the ball-pitching device toward the batting area) from all of the ball coordinate data detected by analyzing the collected images (S150).

Figure 7:
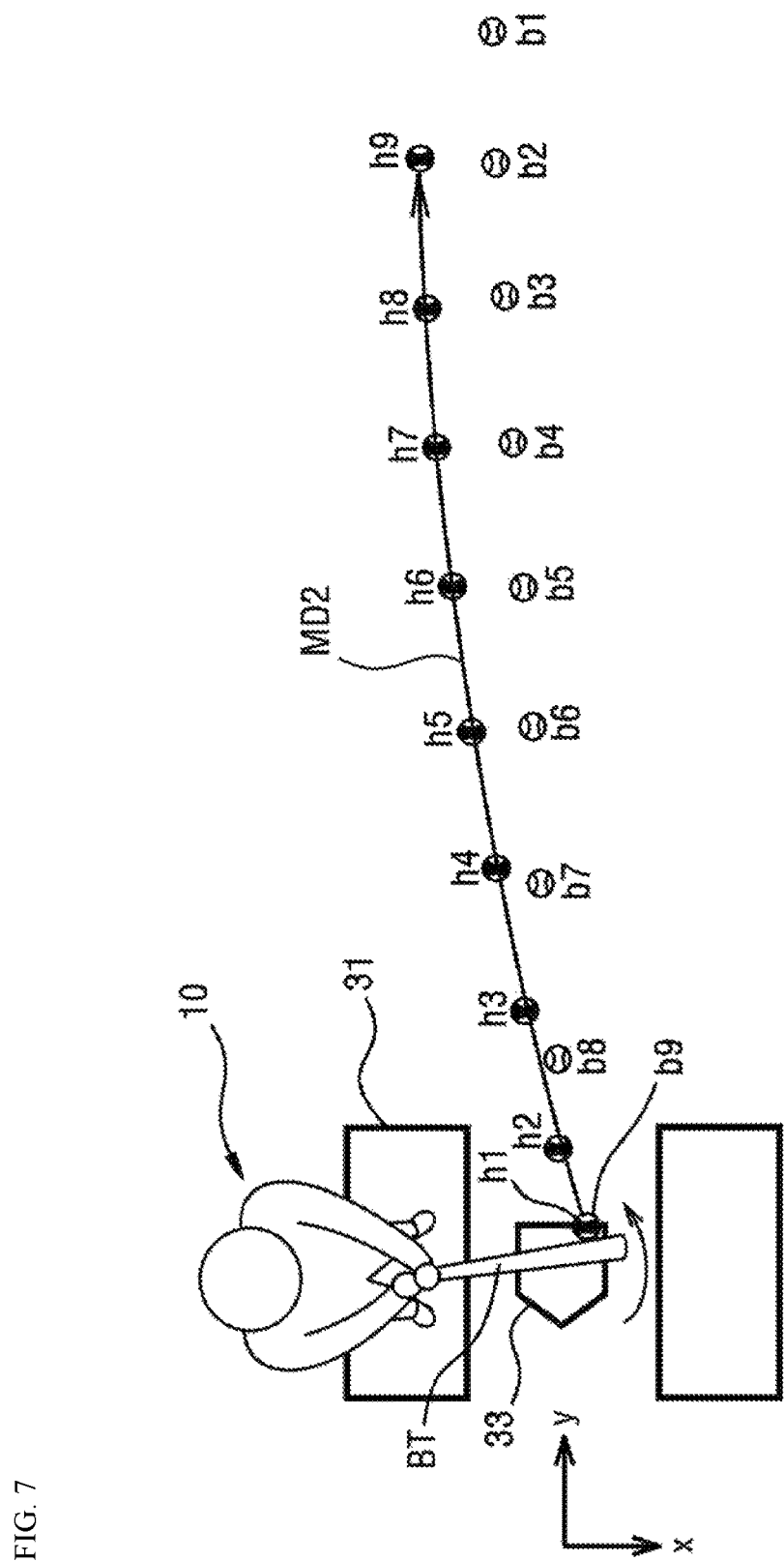
FIG. 7 is a view showing an image captured by a camera constituting the camera device of the sensing device according to the embodiment of the present invention, wherein images of a pitched ball or a hit ball in a plurality of frames of the image are shown together in order to illustrate a process in which the sensing device detects the ball and determines a ball motion model.

This step will be described with reference to FIG. 7. FIG. 7 is a view showing an image captured by one of the cameras constituting the camera device of the sensing device, wherein ball images b1 to b9 and h1 to h9 in a plurality of frames of the image are shown together in order to illustrate a process in which the sensing device detects the ball from the image and determines a ball motion model.

FIG. 7 shows the case in which the user 10 swings a bat BT in order to hit a ball. That is, in FIG. 7, reference symbols h1 to h9 indicate a ball that is moving after the ball is hit.

Step S150 will be described based on the example shown in FIG. 7. In the case in which, when the data b1 to b9 included in the motion model of the pitched ball are removed from all of the data b1 to b9 and h1 to h9 of the ball detected as shown in FIG. 7, there exist residual data, this means that the user 10 hit the ball. In the case in which there exist no residual data, this means that the user 10 did not hit the ball.

When all of the data included in the motion model of the pitched ball are removed even though the user did not hit the ball, some data may remain. In this case, the number of residual data, which may be a basis for determining whether the user hit the ball, may be preset. In the case in which the number of residual data is equal to or greater than the preset number, the sensing-processor may determine that the user hit the ball. In the case in which the number of residual data is less than the preset number or in the case in which there are no residual data, the sensing-processor may determine that the user did not hit the ball.

At step S150 of FIG. 3, therefore, when the coordinate data included in the ball motion model are removed from all of the ball coordinate data, the sensing-processor determines whether there exist residual coordinate data (S200). In the case in which there exist residual data, the sensing-processor determines that the user hit the ball and performs step S210.

That is, the sensing-processor sets a time value at which the ball reaches the home plate as the initial time value, and determines a ball motion model (a motion model of the hit ball) using the three-dimensional coordinate data of the ball after the ball is hit (S210).

The process of determining the motion model of the hit ball may be performed in the same manner as the process of "determining the motion model of the pitched ball", described with reference to FIGS. 5 and 6. However, the "time value at which the ball reaches the home plate", previously calculated, may be used as the initial time value at this time.

Consequently, as shown in FIG. 7, the coordinate data of the ball when the time value at which the ball reaches the home plate is set as the initial time value may become the coordinate data of h1, the coordinate data of the ball from h1 to h9 may be detected (the process of detecting the coordinate data of the ball may also be performed in the same manner as described with reference to FIGS. 5 and 6; that is, the case in which the ball collides with the wall or the ceiling is considered and noise is removed as appropriate in order to acquire the coordinate data of the ball that are finally effective), and the coordinate data of the detected ball h1 to h9 may be applied to each axis-direction function in order to determine a motion model MD2 of the hit ball.

Referring back to FIG. 3, when the motion model of the hit ball is determined as described above, the sensing-processor calculates motion parameters of the hit ball (e.g. the speed, the direction angle, and the height angle of the ball that is moving) based on the determined motion model and transmits the calculated motion parameters to the control device (S220).

The control device realizes an image simulating the trajectory of the hit ball based on the motion parameters of the ball, received from the sensing device, as described above (S230), and determines whether the hit ball in the simulation image is a home run, a hit, a foul, or an out (an infield or outfield fly out or an infield ground out) in order to conduct the baseball practice or the baseball game using the baseball practice apparatus according to the embodiment of the present invention (S240).

Meanwhile, upon determining at step S200 that there exist no residual coordinate data when the coordinate data included in the motion model of the pitched ball are removed from all of the ball coordinate data, the procedure advances to the flowchart shown in FIG. 4, wherein the sensing-processor detects a swing recognition detection area of a predetermined size from the collected images based on the position of the home plate (S310).

Subsequently, the sensing-processor detects the bat held by the user from the extracted swing recognition detection area (S320).

The sensing-processor may detect the bat from the swing recognition detection area in order to determine whether the bat is moving and thus to determine whether the user swung (S400).

In the case in which the bat is detected in the swing recognition detection area and the detected bat is moving, the sensing-processor determines that the user swung, i.e. that the user swung and missed, and transmits the information to the control device (S410).

In the case in which the bat is not detected in the swing recognition detection area, the detected bat is not moving at all, or the movement of the detected bat does not deviate from a predetermined range, the sensing-processor determines that the user did not swing, and determines whether the ball passing through the home plate is a ball or a strike in terms of the ball count (S500 to S530).

These steps will be described in full detail with reference to FIG. 8.

Figure 8:
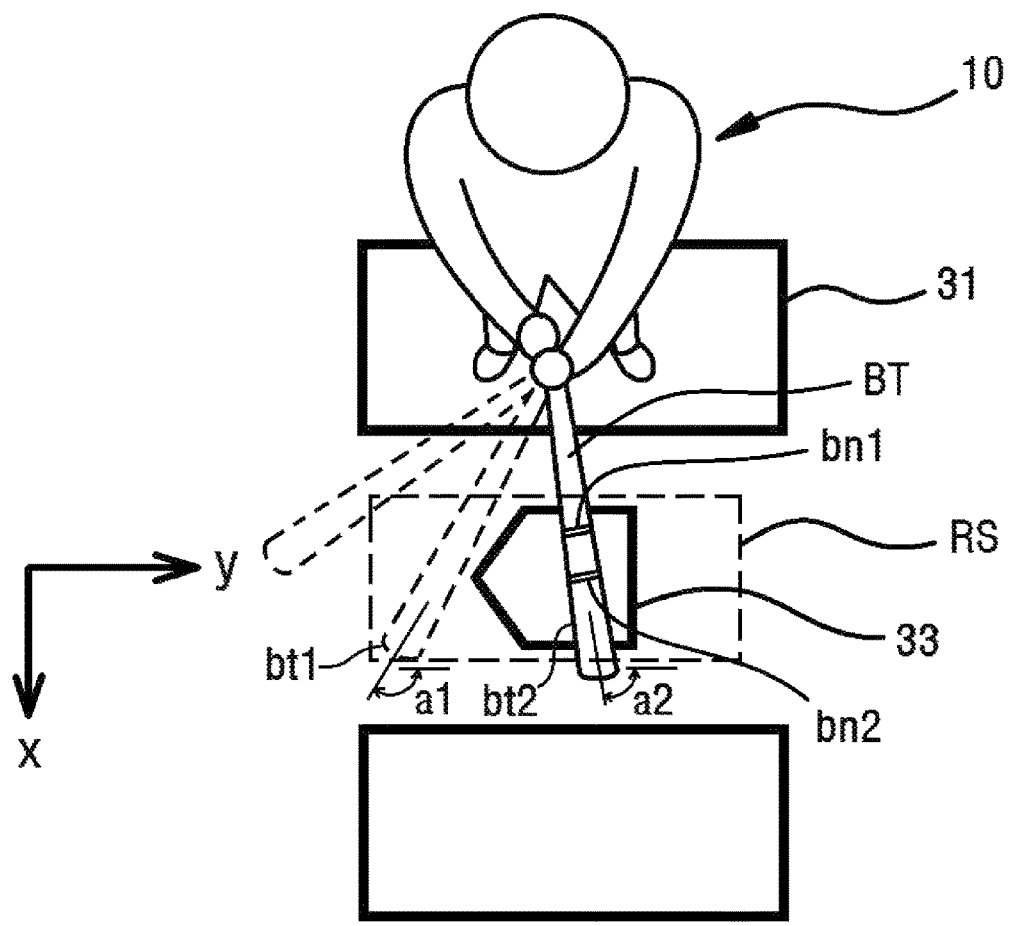
FIG. 8 is an enlarged view of a batting area in an image captured and collected by the sensing device according to the embodiment of the present invention.

FIG. 8 is an enlarged view of the batting area in the image captured and collected by the sensing device.

As shown in FIG. 8, when the user 10 swings the bat BT in the batter's box 31, the bat passes through the home plate 33.

Consequently, as shown in FIG. 8, the sensing-processor may set a swing recognition detection area RS of a predetermined size based over the home plate 33, may separate the set swing recognition detection area RS from the remaining area, may determine whether the bat BT is detected in the swing recognition detection area RS, may determine whether the detected bat BT is moving, and may calculate information about the position and the angle of the detected bat BT.

The bat BT may be detected in the swing recognition detection area RS as follows. A moving object may be detected in a difference image between a reference image extracted in advance from an image and stored (an image of the swing recognition detection area) and a current image of the swing recognition detection area, the image may be binarized, the contour of the moving object may be detected, and the aspect ratio of the detected contour may be calculated. In the case in which the aspect ratio is equal to or greater than a predetermined value, the detected contour may be determined as the bat.

The position and the angle of the bat detected in successive images of the swing recognition detection area may be extracted in order to determine whether the user swung. In the case in which no bat is detected in the swing recognition detection area RS or in the case in which the bat has a state bt1 and an angle a1, as shown in FIG. 8, it may be determined that the user did not swing. In the case in which the bat has a state bt2 and an angle a2, as shown in FIG. 8, it may be determined that the user swung.

The range of the position (or the state) and the angle of the bat at which it is determined that the user swung, as described above, may be preset.

For example, in FIG. 8, in the case in which the position of the bat is detected at the rear side of the swing recognition detection area RS, as indicated by bt1, and the angle between the bat and a line extending parallel to the y-axis is greater than 90 degrees, it may be determined that the user did not swing. In FIG. 8, in the case in which the position of the bat is detected at the front side of the swing recognition detection area RS, as indicated by bt2, and the angle between the bat and a line extending parallel to the y-axis is less than 90 degrees, it may be determined that the user swung.

Here, the front side and the rear side of the swing recognition detection area RS may be preset as follows. For example, the swing recognition detection area RS may be divided into halves in the x-axis direction, and the left part of the swing recognition detection area RS may be preset as the rear side of the swing recognition detection area RS while the right part of the swing recognition detection area RS may be preset as the front side of the swing recognition detection area RS. Alternatively, the home plate 33 may be divided into halves in the x-axis direction, and the left part of the home plate 33 may be preset as the rear side of the swing recognition detection area RS while the right part of the home plate 33 may be preset as the front side of the swing recognition detection area RS.

Meanwhile, the bat may be detected in the swing recognition detection area RS using a method other than the method of investigating the swing recognition detection area RS in order to detect the bat using the aspect ratio, as described above. A marker may be actually attached to the bat, and the marker may be detected in the swing recognition detection area RS in order to acquire information, such as the movement of the bat, the position of the bat, and the angle of the bat.

For example, as shown in FIG. 8, a first marker bn1 and a second marker bn2 actually attached to the bat may be detected in the swing recognition detection area RS. The movement of the bat may be detected based on the motions of the detected first and second markers bn1 and bn2, the position of the bat may be detected using the positions of the detected first and second markers bn1 and bn2, and the angle between a line passing through the centers of the detected first and second markers bn1 and bn2 and a line extending parallel to the y-axis may be calculated to acquire the angle of the bat. Even in the case in which a single marker, rather than a plurality of markers, is attached, it is also possible to acquire the movement, the position, and the angle of the bat.

In addition, in the case in which detection of the bat fails even though an attempt to detect the bat is made using the aspect ratio of the object detected in the swing recognition detection area RS, as described above, in order to determine whether the user swung, the bat may be detected by secondarily detecting the markers.

Referring back to FIG. 4, the bat may be detected by investigating the swing recognition detection area in order to determine whether the user swung, as described with reference to FIG. 8. Upon determining that the user swung, steps S410 and S420 are performed. In the case in which the bat is not detected as the result of investigating the swing recognition detection area or in the case in which it is determined that the user did not swing based on the position and the angle of the detected bat, steps S500 to S530 are performed.

That is, the sensing-processor extracts the three-dimensional coordinate data of the ball passing through the home plate (S500), and investigates whether the extracted three-dimensional coordinate data of the ball (detected as the ball passing through the home plate) are within a strike zone having a predetermined position and size (S510).

The strike zone may be set so as to have a size that obeys the rules of a general baseball game, or may be arbitrarily set.

The strike zone may be preset so as to have a plane parallel to the z-x plane of the x-y-z coordinate system shown in FIG. 1 and so as to have the above-defined size. The position of the strike zone in the z-x plane may be preset so as to have the above-defined size.

However, the position of the strike zone on the y-axis is not fixed. The position of the strike zone on the y-axis may be set as the position of the ball that is detected first over the home plate 33, and the position of the ball that is detected first over the home plate 33 is included in the strike zone in order to determine whether the pitched ball is a ball or a strike in terms of the ball count.

In the case in which the three-dimensional coordinates of the ball passing through the home plate are within the strike zone, the control device adds a strike record to the ball count (S520). In the case in which the three-dimensional coordinates of the ball passing through the home plate deviate from the strike zone, the control device adds a ball record to the ball count (S530).

As described above, the baseball practice apparatus according to the present invention and the sensing device used in the baseball practice apparatus are capable of acquiring an image of the motion of a pitched ball or a hit ball and analyzing the acquired image in order to calculate an accurate and rapid motion model of the ball, which shows how the ball moves, whereby it is possible to very accurately and rapidly calculate various kinds of information necessary for conducting a baseball practice or a baseball game, such as motion parameters of the pitched ball or the hit ball. In addition, it is possible to analyze the motion of a pitched ball or a hit ball, to determine whether a user swung, to determine whether the user hit a ball, and to determine whether the pitched ball is a ball or a strike using only a single sensing device.

INDUSTRIAL APPLICABILITY

The sensing device and the sensing method used in the baseball practice apparatus, the baseball practice apparatus using the sensing device and the sensing method, and the method of controlling the baseball practice apparatus according to the present invention are industrially applicable in a technical field that allows a user to perform baseball practice or play a virtual baseball game in such a manner that the user hits a ball pitched by the ball-pitching device with a bat in an indoor space of a predetermined size, and the sensing device senses hitting and realizes a simulation image on the screen in front of the user.

The invention claimed is:

1. A sensing device used in a baseball practice apparatus that allows a user to perform a baseball practice or to play a baseball game based on a virtual baseball image, the sensing device comprising:
   a camera device for successively capturing images of a moving ball; and
   a sensing-processor for collecting the images captured by the camera device, extracting ball candidates through analysis of the images, arbitrarily selecting a predetermined number of data from coordinate data of the ball candidates to establish an arbitrary motion model, calculating coordinates of the ball in a three-dimensional space by removing coordinate data contained in the established arbitrary motion model in a case in which initial coordinate data of the ball based on the established arbitrary motion model deviate from a predetermined range, determining a motion model of the ball using the calculated coordinate data, and calculating information necessary for conducting the baseball practice or the baseball game using the determined motion model of the ball.

2. The sensing device according to claim 1, wherein the sensing-processor is configured to determine whether the user hit the pitched ball using the motion model of the ball, to extract a motion model of the hit ball using the coordinate data of the ball in the three-dimensional space upon determining that the user hit the pitched ball, and to calculate a motion parameter of the ball using the extracted motion model of the hit ball.

3. The sensing device according to claim 1, wherein the sensing-processor is configured to determine whether the user hit the pitched ball using the motion model of the ball, to determine whether the user swung by analyzing the collected images to detect a bat upon determining that the user did not hit the pitched ball, and
wherein the sensing-processor transmits a result of determination to the baseball practice apparatus such that a strike record is added to a ball count if the sensing-processor determines that the user swung, or the sensing-processor determines whether the pitched ball is a ball or a strike using the coordinate data of the ball over a home plate in the three-dimensional space if the sensing-processor determines that the user did not swing.

4. A sensing method of a sensing device used in a baseball practice apparatus that allows a user to perform a baseball practice or to play a baseball game based on a virtual baseball image, the sensing method comprising:
successively capturing and collecting images of a moving ball;
analyzing the collected images to extract the ball and calculating coordinates of the ball in a three-dimensional space to extract coordinate data of the ball;
determining a motion model of the ball using the extracted coordinate data; and
calculating information necessary for conducting the baseball practice or the baseball game using the determined motion model of the ball, wherein the step of extracting the coordinate data of the ball comprises:
extracting ball candidates through analysis of the images;
arbitrarily selecting a predetermined number of data from coordinate data of the ball candidates to establish an arbitrary motion model; and
removing coordinate data contained in the established arbitrary motion model in a case in which initial coordinate data of the ball based on the established arbitrary motion model deviate from a predetermined range.

5. The sensing method according to claim 4, wherein the step of extracting the coordinate data of the ball comprises
removing ball candidates detected after collision in a case in which the moving ball collides with a wall or a ceiling.

6. The sensing method according to claim 4, wherein
the step of determining the motion model of the ball comprises determining a motion model of the ball that is moving toward a batting area after being pitched using an initial time value or initial coordinate data of the ball, and wherein
the step of calculating the information necessary for conducting the baseball practice or the baseball game comprises determining that the user hit the pitched ball in a case in which a number of data left by removing coordinate data of the ball contained in the determined motion model from all coordinate data of the ball is equal to or greater than a predetermined number and determining that the user did not hit the pitched ball in a case in which the left number of data is less than the predetermined number or in a case in which no data are left.

7. The sensing method according to claim 4, wherein
the step of determining the motion model of the ball comprises calculating a time value at which the pitched ball reaches a home plate, and wherein
the step of calculating the information necessary for conducting the baseball practice or the baseball game comprises:
determining a motion model of the moving ball in a state in which the time value at which the pitched ball reaches the home plate is set as an initial time value and coordinate data of the ball at the initial time value are set as initial coordinate data of the ball; and
calculating a motion parameter of the ball based on the determined motion model.

8. The sensing method according to claim 4, wherein the step of calculating the information necessary for conducting the baseball practice or the baseball game comprises:
determining whether the user hit the pitched ball using the determined motion model of the ball;
extracting a motion model of the hit ball using the coordinate data of the ball in the three-dimensional space upon determining that the user hit the pitched ball; and
calculating a motion parameter of the ball using the extracted motion model of the hit ball.

9. The sensing method according to claim 8, wherein the step of calculating the information necessary for conducting the baseball practice or the baseball game comprises:
determining whether the user hit the pitched ball using the determined motion model of the ball;
determining whether the user swung by analyzing the collected images to detect a bat upon determining that the user did not hit the pitched ball; and
determining whether the coordinates of the ball over a home plate in the three-dimensional space are within a predetermined strike zone to determine whether the pitched ball is a ball or a strike upon determining that the user did not swing.

10. A baseball practice apparatus that allows a user to perform a baseball practice or to play a baseball game based on a virtual baseball image, the baseball practice apparatus comprising:
a ball-pitching device for pitching a ball toward a batting area, in which the user hits the ball;
a sensing device for successively capturing and collecting images of a moving ball, analyzing the collected images to extract the ball, calculating coordinates of the ball in a three-dimensional space, determining a motion model of the ball using the calculated coordinate data, and calculating information using the determined motion model of the ball; and
a control device for receiving the information calculated by the sensing device and realizing an image for conducting the baseball practice or the baseball game based on the received information, wherein
the sensing device is configured to determine the motion model of the ball that is moving toward a batting area after being pitched using an initial time value or initial coordinate data of the ball, to determine that the user hit the pitched ball in a case in which a number of data left by removing coordinate data of the ball contained in the determined motion model from all coordinate data of the ball is equal to or greater than a predetermined number and to determine that the user did not hit the pitched ball in a case in which the left number of data is less than the predetermined number or in a case in which no data are left.

11. The baseball practice apparatus according to claim 10, wherein
   the sensing device is configured to determine whether the user hit the pitched ball using the motion model of the ball, to extract a motion model of the hit ball using the coordinate data of the ball in the three-dimensional space upon determining that the user hit the pitched ball, to calculate a motion parameter of the ball using the extracted motion model of the hit ball, and to transmit the calculate motion parameter of the ball to the control device, and wherein
   the control device is configured to realize an image simulating a trajectory of the hit ball based on the received motion parameter of the ball, received from the sensing device and to determine whether the hit ball in the simulation image is a home run, a hit, a foul, or an out in order to conduct the baseball practice or the baseball game.

12. The baseball practice apparatus according to claim 10, wherein
   the sensing device is configured to determine whether the user hit the pitched ball using the motion model of the ball, to determine whether the user swung by analyzing the collected images to detect a bat upon determining that the user did not hit the pitched ball, and to transmit a result of determination to the control device upon determining that the user swung, and wherein
   the control device is configured to perform control such that a strike record is added to a ball count of the user based on the received information in order to conduct the baseball practice or the baseball game.

13. The baseball practice apparatus according to claim 10, wherein
   the sensing device is configured to determine whether the user hit the pitched ball using the motion model of the ball, to determine whether the user swung by analyzing the collected images to detect a bat upon determining that the user did not hit the pitched ball, to extract coordinate data of the ball over a home plate in the three-dimensional space upon determining that the user did not swing, to determine whether the extracted coordinates of the ball are within a predetermined strike zone, and to transmit a result of determination to the control device, and wherein
   the control device is configured to perform control such that a strike record is added to a ball count of the user upon determining, based on the received information, that the extracted coordinates of the ball over the home plate are within the strike zone and to perform control such that a ball record is added to the ball count of the user upon determining that the extracted coordinates of the ball over the home plate are not within the strike zone in order to conduct the baseball practice or the baseball game.

* * * * *